US012794875B2

(12) United States Patent
Joshi et al.

(10) Patent No.: US 12,794,875 B2
(45) Date of Patent: Nov. 10, 2026

(54) AUTHENTICATION MECHANISM USING OPEN AUTHORIZATION BASED IDENTITY PROVIDERS FOR BACKUP CLIENTS

(71) Applicant: Dell Products L.P., Round Rock, TX (US)

(72) Inventors: Abhidnya Sushant Joshi, Pune (IN); Omkar Anand Ekbote, Pune (IN); Donna Barry Lewis, Holly Springs, NC (US); Senthilkumar Ponnuswamy, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 18/791,364

(22) Filed: Jul. 31, 2024

(65) Prior Publication Data

US 2026/0039648 A1 Feb. 5, 2026

(51) Int. Cl.

| | |
|---|---|
| ***H04L 29/06*** | (2006.01) |
| ***G06F 11/1446*** | (2026.01) |
| ***G06F 21/62*** | (2013.01) |
| ***H04L 9/40*** | (2022.01) |

(52) U.S. Cl.

CPC ........ *H04L 63/083* (2013.01); *G06F 11/1453* (2013.01); *G06F 21/6218* (2013.01); *H04L 63/0807* (2013.01); *H04L 63/0823* (2013.01); *G06F 2201/84* (2013.01)

(58) Field of Classification Search

CPC ............... H04L 63/083; H04L 63/0807; H04L 63/0823; G06F 11/1453; G06F 21/6218; G06F 2201/84

USPC .............................................................. 726/4

See application file for complete search history.

(56) References Cited

U.S. PATENT DOCUMENTS

| | | | | |
|---|---|---|---|---|
| 11,868,213 | B2 * | 1/2024 | Zheng | G06F 11/1451 |
| 2001/0028603 | A1 * | 10/2001 | Shimazu | G06F 16/2457 368/10 |
| 2016/0044035 | A1 * | 2/2016 | Huang | H04L 9/3073 726/4 |
| 2019/0081943 | A1 * | 3/2019 | Yamanakajima | H04L 63/083 |
| 2019/0108326 | A1 * | 4/2019 | Fujimaki | G06F 21/6218 |
| 2019/0372962 | A1 * | 12/2019 | Maria | H04L 63/108 |
| 2020/0137069 | A1 * | 4/2020 | Gerweck | G06F 16/22 |

(Continued)

OTHER PUBLICATIONS

D'Silva, "Building A Zero Trust Architecture Using Kubernetes", Apr. 2021, IEEE, pp. 1-8 (Year: 2021).*

(Continued)

*Primary Examiner* — Taghi T Arani
*Assistant Examiner* — Gregory A Lane
(74) *Attorney, Agent, or Firm* — Staniford Tomita LLP

(57) ABSTRACT

Embodiments for using open authorization of backup clients in a DDBoost system to access legacy protected data. A DDBoost server on a Data Domain storage system registers itself as an open authorization (OIDC) client with an identity provider server. Third party applications can leverage open authorization without needing to interact with the identity provider. Identity provider server details are stored on the DDBoost to creates a single point of configuration to plug in. Cloud providers that provide their own identity provider can be configured and used with the Data Domain system for the DDBoost data path. This allows a user to access data stored and protected using legacy (non-open authorization) protocols.

12 Claims, 8 Drawing Sheets

(56) References Cited

U.S. PATENT DOCUMENTS

| | | | | |
|---|---|---|---|---|
| 2021/0297862 | A1* | 9/2021 | Fukuda | H04L 9/0825 |
| 2021/0406129 | A1* | 12/2021 | Zheng | G06F 11/1451 |
| 2023/0009739 | A1* | 1/2023 | Ponnuswamy | H04L 9/3213 |
| 2023/0222039 | A1* | 7/2023 | Madan | G06F 16/172<br>707/675 |

OTHER PUBLICATIONS

Huang, "Survey on securing data storage in the cloud", 2014, APSIPA, pp. 1-14 (Year: 2014).*

* cited by examiner

AUTHENTICATION MECHANISM USING OPEN AUTHORIZATION BASED IDENTITY PROVIDERS FOR BACKUP CLIENTS

TECHNICAL FIELD

This invention relates generally to data protection systems, and more specifically to securely authenticating backup clients using open authority based identity providers.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Data protection comprising backup and recovery software is crucial for enterprise-level network clients. Customers rely on backup systems to efficiently back up and recover data in the event of user error, data loss, system outages, hardware failure, or other catastrophic events to allow business applications to remain in service or quickly come back up after a failure condition or outage. In a typical data backup system, a large number (e.g., hundreds to thousands) of clients (data sources) send data for backup in a storage system, such as a DellEMC Data Domain device, while a backup server orchestrates the workflow for backing up the user data from the various clients.

A typical data storage system allows users (clients) to perform many different data operations, such as file modification or movement, data deletion or addition, and so on. To maintain data integrity and security, it is important to authenticate such clients, as well as the servers and storage devices. Most present authentication systems rely on user credentials (e.g., username/password) to verify the authenticity of client identities and requests. A typical workflow for backing up the user data starts with the backup server creating a directory in the storage system for the client data backup. The backup server associates a storage system user and password with the directory it created for backup clients to authenticate. The backup server then stores the storage system user credentials. Whenever a backup client needs to send the data to the storage system, the backup server will send the storage system user credentials to the backup client. The backup client then uses these credentials to authenticate itself to the storage system.

Standard file transfer protocols like CIFS/SMB and NFS (Network File System) support a variety of authentication mechanisms for a user, such as NTLM, Kerberos, and so on. A Data Domain proprietary file transfer protocol, DDBoost, implements a custom authentication mechanism that is based on an RPC style communication. These older ("legacy") authentication mechanisms typically rely on familiar user credentials, ticket-based authentication, or other challenge-response techniques.

Certain open authorization products have been introduced for accessing websites, such as OAuth 2.0 (Open Authorization 2.0), which presently is a widely used authentication mechanism. This program authenticates users from a variety of sources (AD/LDAP/NIS etc.), and is especially effective for evolving cloud-heavy deployments. Such open authorization products, however, are not always compatible with legacy data path protocols, which is a significant disadvantage for widespread use as they cannot be used to access the data protected by the legacy authentication mechanisms (e.g., credentials, tickets, etc.). In general, the term "legacy" refers to access protocols that pre-date or are not any of the open authorization protocols.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
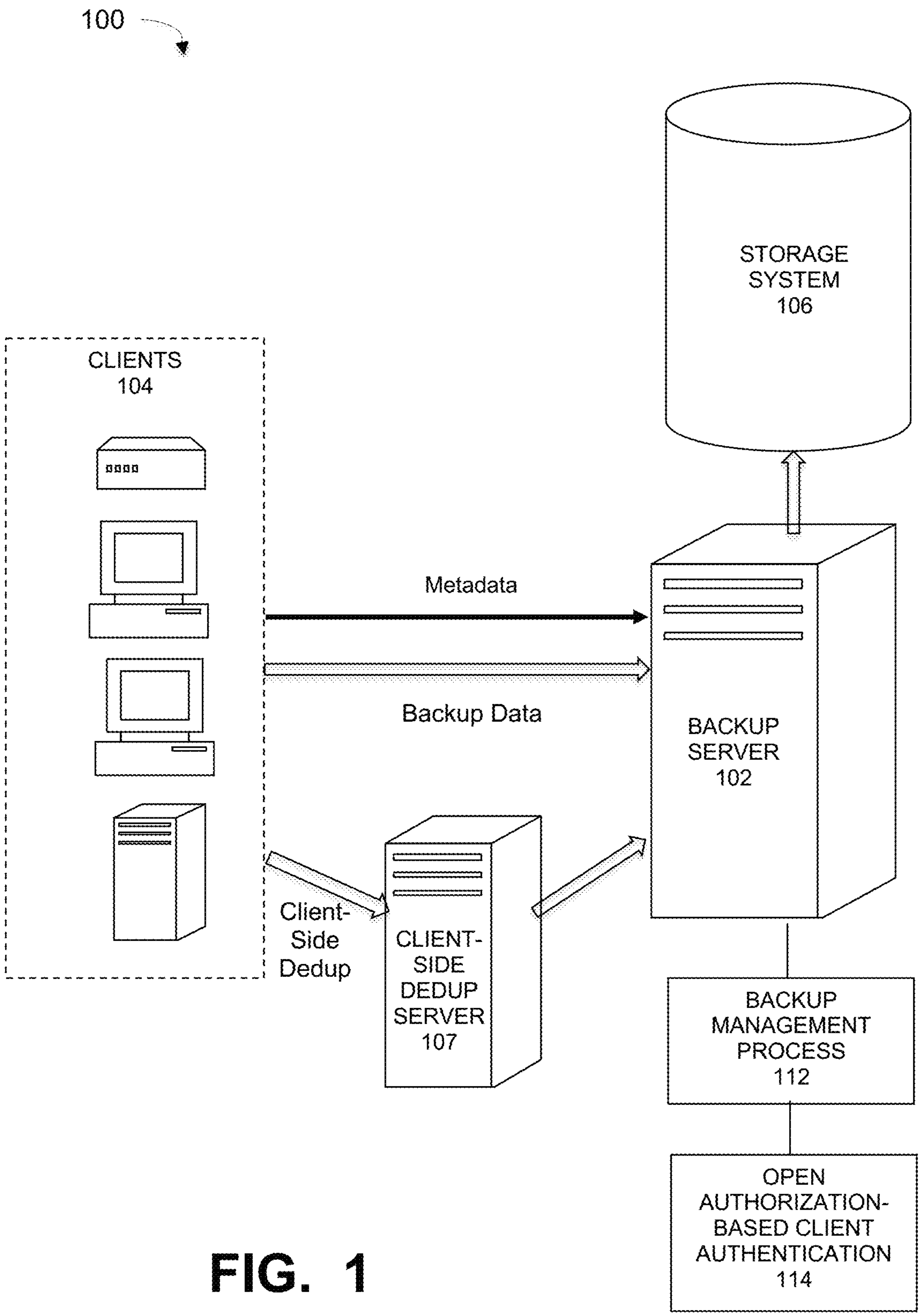
FIG. 1 is a diagram of a such a data storage system implementing secure client authentication through open authorization mechanisms, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), or metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. Any such network may be implemented using protocols such as Transmission Control Protocol (TCP) and/or Internet Protocol (IP), well known in the relevant arts. In a cloud computing environment, at least some of the applications, servers and data can be partially maintained and provided through a centralized cloud computing platform.

Embodiments are described for a data storage system implementing secure client authentication, and for a proprietary DDBoost client to authenticate users from various OAuth2 protocol-based identity providers allowing for a SSO (Single-Sign-On) experience while enabling interoperability with legacy data access protocols (i.e., those that leverage LDAP, Kerberos, NTLM etc.) in the same underlying filesystem. The DDBoost client independently connects to an identity and access management (IAM) server to obtain a JWT (JSON web token) which can then be used to connect to a DD (Data Domain) storage system as a specific user.

FIG. 1 is a diagram of a such a data storage system implementing secure client authentication through open authorization mechanisms, under some embodiments. System 100 illustrates an example of a large-scale data processing storage system that may comprise a number of server and client computers coupled together in one or more public and/or private networks. System 100 includes a backup server 102 that executes a data storage or backup management process 112 that coordinates or manages the backup of data from one or more data sources to storage devices, such as storage system 106 or any other network (primary/secondary) storage, client storage, and/or virtual storage devices that may be provided. These storage devices serve as source storage devices that hold data to be backed up from the one or more data sources, such as database or other application server and client computers.

The backup data is sourced by any number of clients 104, which might be any type of network device, computer, file system, virtual machine, data center, and so on. The data sourced by the clients may be any appropriate data, such as database data that is part of a database management system or any other appropriate application. The backup server 102 causes or facilitates the backup of client data to storage system 106, which may at least be partially implemented through storage device arrays, such as RAID components. System 100 may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, system 100 may represent a network that includes, among other elements, a Data Domain Restorer (DDR)-based deduplication storage system, such as provided by DellEMC Corporation. However, other similar backup and storage systems are also possible.

In an embodiment, the clients 104 may send certain OS level backup metadata, log files, and other such data to the backup server 102. In an embodiment, the storage system 106 may be implemented in a DellEMC Avamar system, which is used to backup file systems, virtual machines, low change rate databases, remote offices, and various client devices 104. In this system, an Avamar server may be selected as the backup target, in which case an Avamar client on each host performs deduplication segment processing with data and metadata stored on the Avamar server. If the Data Domain (DD) system is selected as the backup target, the backup data is transferred to the DD backup server 102 and the related metadata generated by the Avamar client software is simultaneously sent to the Avamar server (in storage system 106) for storage. The metadata allows the Avamar management system to perform data restores directly from the Data Domain system without going through the Avamar server.

In an embodiment, the backup server 102 implements a deduplication backup process as a form of single-instance storage that eliminates redundant copies of data to reduce storage overhead. For deduplication, methods are used to store only one unique instance of data by replacing redundant data blocks with pointers to the unique data copy. As new data is written to a system, duplicate chunks are replaced with these pointer references to previously stored data. To service an input/output (I/O) operation initiated for deduplicated backups, the Data Domain File System (DDFS) must initiate multiple internal I/O operations, such as to lookup LP segment fingerprints, look up indexes, read container metadata, and to read the actual data before servicing the I/O to the backup application. However, the use of pointers greatly reduces the amount of data that needs to be stored.

In an embodiment, the deduplication process may be performed as a server-side process, such as by server 102. Alternatively, the deduplication process may be performed by a distributed deduplication process, such as by a client-side deduplication server 107. In an embodiment, server 107 implements the DDBoost ("Boost") protocol for performing distributed data processing and storage in large data processing and storage systems. DDBoost is a protocol implemented by Data Domain for performing distributed deduplication of user data sent from a client application to a Data Domain server for persistent storage. With DDBoost, an application on a client 104 calls client library APIs that make remote procedure (RPC) calls to the Data Domain server 102. A client-side library cooperates with server-side code to perform distributed deduplication of user data to minimize the data that is actually sent to the server and to minimize the physical storage required to store the data. The architecture splits DDBoost into separate components, one on the client system and one on the server system. DDBoost is essentially a hybrid process, where some of the deduplication steps occur on the client and some on the server, that is, it represents a distributed deduplication method.

Although embodiments are described with respect to deduplication backup systems, embodiments are not so limited. Backup systems not using deduplication methods can also be used with the secure authentication processes and components described herein.

Likewise, example embodiments will be described in relation to a Data Domain and DDBoost architecture, however it should be noted that any other server-side, client-side, or distributed deduplication process or system that uses deduplication is also possible, as well as any data storage system that does not use deduplication, as stated above.

Although FIG. 1 illustrates an example embodiment showing one set of clients 104 and a single server 102 and storage system 106, it should be noted that system 100 may be scaled to any appropriate number of client-server computers, each with their own respective network connections to other internal or external system resources. Thus, system 100 may comprise a number of servers 106, a large number of distributed clients 120, one or more backup servers 102.

As stated earlier, in a typical data storage system with (many) multiple clients 104, some method of client verification must be implemented to ensure data integrity and security by restricting user access to only valid and verified users. Such verification is often provided through the use of IAM (identity and access management) frameworks that control what users in an organization can access so that sensitive data and functions are restricted to only those that are authorized to use them. In general, IAM is used to give secure access to resources (data and applications) to verified entities (e.g., employees, customers, third parties, etc.) with minimal interference.

IAM services may be provided by certain commercial identity providers, or they may be implemented in-house by an organization. An IAM or identity server is typically used to store user, company, and resource data that is then used to control access to allow or block user requests to the system resources. In an embodiment, the data backup system 100 is adapted through process 114 to access and work with an identity server to allow the use of modern open authorization protocols, such as OAuth2, with data protected with older authentication protocols.

In a typical filesystem, a directory can have multiple files with different owners. This requires each user must be authenticated for accessing a file in a directory. However, in the case of a backup, the complete directory is owned by the backup server (e.g., 102). In this case, it is sufficient to verify that: (1) the backup server is authenticated to have access to the directory, (2) the backup server has granted permission to the backup client to have access the directory, and (3) the backup client has permission to the path it wants to operate on.

As an alternative to traditional credentials (user_ID/password), certain file system protocols, such as NFS (Network File System) or CIFS (Common Internet File System) may be implemented in a way that they are either unsecured, or use ticket-based authentication. One such present method is Kerberos authentication that is a protocol that works on the basis of tickets to allow nodes communicating over a non-secure network to prove their identity. Such an approach requires customers to have a Kerberos implementation in their data center, which imposes significant infrastructure overhead and maintenance. This and other similar authentication protocols are and have been widely used, thus creating a vast amount of data that is protected with what can be termed "legacy" data access protocols. As stated above, present implementations of newer open authorization protocols, such as OAuth2 are not compatible with these legacy protocols, and thus cannot be used to access that data.

Embodiments include an open authorization process 114 to authenticate users from various OAuth2 (and similar) protocol-based identity providers to enable interoperability with legacy data access protocols in the same underlying filesystem. The backup system 100 is configured to allow access to data protected by credential and ticket-based (e.g., Kerberos) authentication through open authorization systems by using an identity provider and identity mapper that provides a web token to connect to the storage system.

Figure 2:
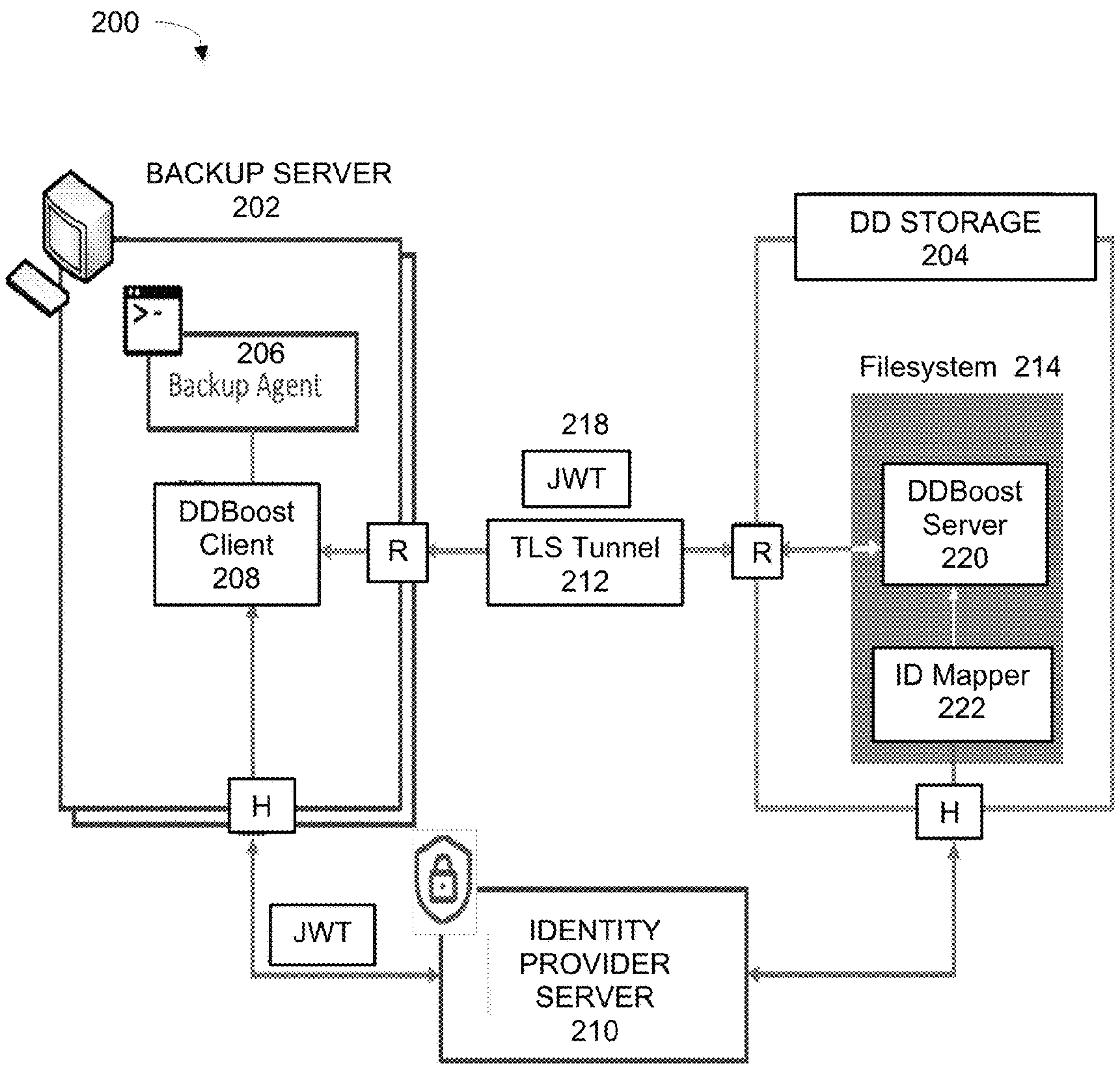
FIG. 2 is a block diagram illustrating a DDBoost system implementing an open authorization protocol, under some embodiments.

FIG. 2 is a block diagram illustrating a DDBoost system implementing an open authorization protocol, under some embodiments. As shown in FIG. 2, system 200 comprises a backup server 202 that manages and orchestrates backup workflows for data to be protected for backup sources, which may number in the thousands in a typical large-scale network. Such a server may correspond to backup server 102 in FIG. 1.

A backup agent 206 resides on each data source whose data needs to be backed up. The backup agent connects to a DDBoost client 208. In general, a data source may comprise or be referred to as a "backup client" or alternatively as a "backup host".

The backup server 202 stores backup data in a Data Domain storage system 204, which maintains a filesystem 214. The filesystem 214 includes a DDBoost server 220 on the storage-side that communicates with the DDBoost client 208 on the source-side. In an embodiment, the DDBoost server 220 interfaces with the DDBoost client 208 through a transport layer security (TLS) tunnel 212. A TLS tunnel encrypts data sent over a TCP connection at the TCP sockets layer, rather than at the application to provide a secure protocol for Internet use. Other similar transport protocols may also be used, however. In an embodiment, the DDBoost server 220 interfaces with TLS tunnel 212 through remote procedure calls (R), as likewise does the DDBoost client 208.

System 200 also includes an identity provider server 210, which is maintained by a provider that supports OAuth2, or other similar protocols, such as OpenID Connect (OIDC), and the like. This server can reside either inside or outside of storage system 204. The identity provider 201 communicates with the backup server 202 and storage system 204 over HTTPS REST (H) interfaces. Within filesystem 214, an ID mapper component 222 provides identity mapping functions that query identity providers to obtain a common unique identifier for a user that is stored in the filesystem.

Through this system, the DDBoost client independently connects to an identity server to obtain a JWT (JSON web token) 218 which can then be used to connect to the storage system as a specific user.

A JSON web token is a compact and self-contained way of securely transmitting data over non-secure networks using digital signature that is signed using a secret or a public/private key pair. A JWT is a three-part data structure comprising a header, payload, and signature in a specific format (i.e., xxxx.yyyy.zzzz). When tokens are signed using public/private key pairs, the signature also certifies that only the party holding the private key is the one that signed it. For user authentication, once the user is logged in, each subsequent request will include the JWT, allowing the user to access network resources that are permitted with that token. Although embodiments are described with respect to use of JSON web tokens, embodiments are not so limited, and any other similar tokens using digital signatures such as public/private keys, and with or without encryption, may be used.

Figure 3:
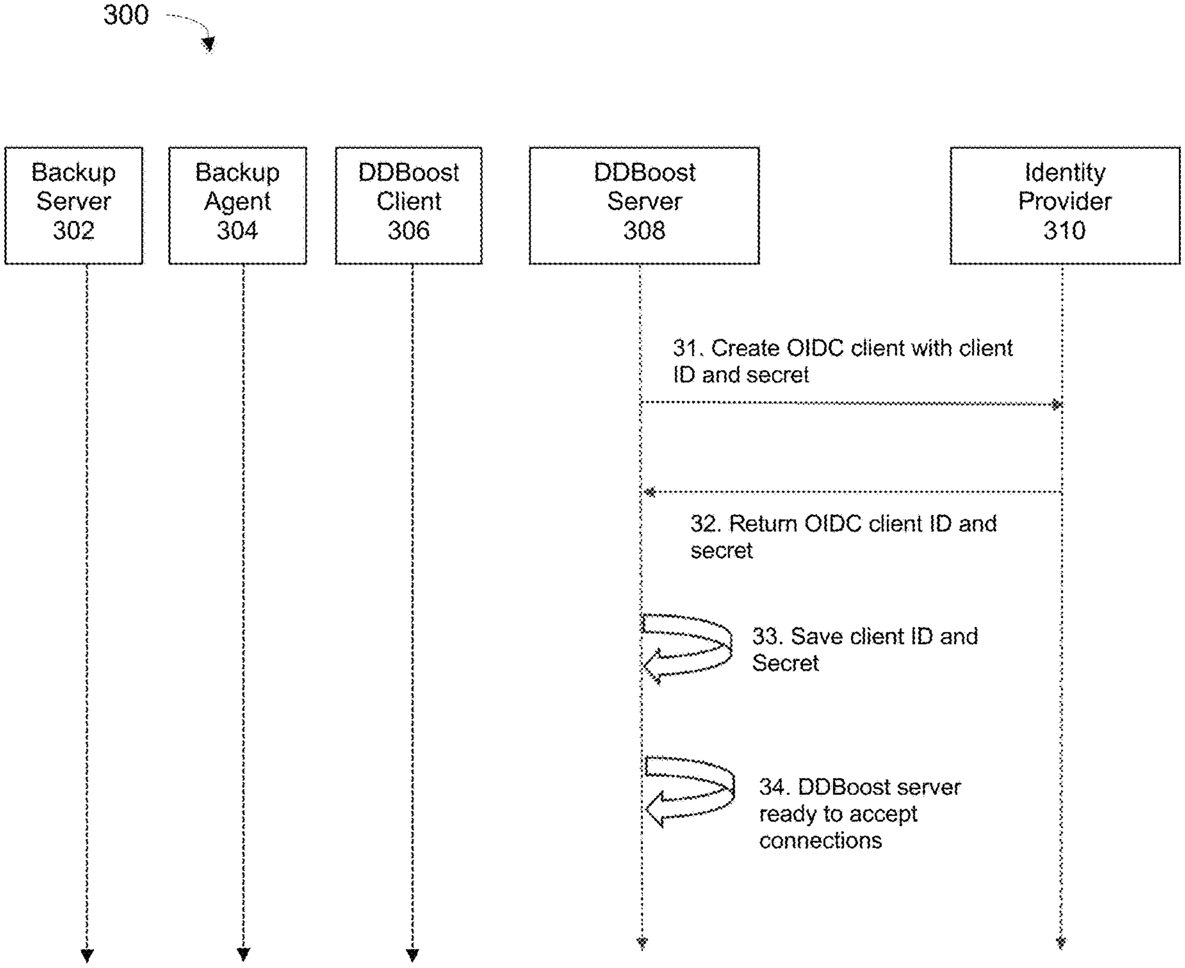
FIG. 3 illustrates a sequence of operations of a configuration process for using an identity provider for the system of FIG. 2, under some embodiments.

FIG. 3 illustrates a sequence of operations of a configuration process for using an identity provider for the system of FIG. 2, under some embodiments. Diagram 300 of FIG. 3 illustrates some of the processing steps among the elements of system 200 of FIG. 2 in a one-time configuration process between a DDBoost server and identity provider.

Diagram 300 of FIG. 3 illustrates some of the processing steps among a backup server 302, a backup agent 304, a DDBoost client 306, a DDBoost server 308, and an identity provider 310. The process starts (step 31) with the DDBoost server 308 creating an OIDC client with a client ID and client secret in the identity provider 310. The OIDC client can be created with an authentication type "signed jwt and client secret."

In step 31, the client secret comprises a phrase or alphanumeric string provided by the user and provided to the system. The JWT token is generated for and signed by the user. In an embodiment, this can be performed using established OpenID Connect 1.0 mechanism that provide a simple identity layer on top of the OAuth 2.0 protocol, and which enables clients to verify the identity of the user based on the authentication performed by an authorization server, as well as to obtain basic profile information about the user in an interoperable and REST-like manner.

The identity provider 310 then returns the OIDC client ID and secret to the DDBoost server 308, step 32. The DDBoost server saves the client ID and secret (step 33), and is then ready to accept connections from backup agents (step 34).

This process only requires the DDBoost server 220 on the DD storage system 204 to register itself as an OIDC client with the IAM server 210. The backup server 202, backup agent 206 and DDBoost client 208 in system 200 are not required to register with the identity provider 210, and are therefore idle through the sequence shown in FIG. 3. This greatly simplifies the in-field configuration and reduces potential issues during upgrades. It also allows DDBoost integrated with third party applications to leverage the OAuth2 mechanism with an identity provider without needing the application to configure or interact with the identity provider.

The identity provider server details are stored on the DDBoost server 220, which creates a single point of configuration to plug in any OpenID provider. Cloud providers typically provide their own identity provider, which can also be configured and used with the Data Domain system for the DDBoost data path.

Once configured with the identity provider, the backup hosts can access data in legacy storage systems through an authentication process. In this process, the backup server 202 stores a host certificate (to identify the machine) and a backup application orchestrator passes a user certificate to the backup agent at the time of backup to specify a user to be used for this session. This avoids storing any passwords and utilizes a non-interactive method for authenticating the user.

The DDBoost client 208 uses the OIDC client ID and signed JWT client assertion received from the DDBoost server 220 to obtain a JWT access token for the user denoted by the user certificate. These steps verify the identity of both the host (backup server) and the user.

The first RPC from the DDBoost client 208 to the DDBoost server 220 performs a TLS handshake and establishes a TLS tunnel that encrypts all further communication over—the—wire. The JWT access token returned by the identity provider 210 contains custom claims that allow the filesystem to derive a unique identifier for this user to be used for authorization. These custom claims are mapped to specific fields in the external identity provider's user information (e.g., UID, GID, SID) to enable interoperability with other data access protocols (e.g., NFS, CIFS) that use the same fields to identify the user. This also enables users authenticated via the proposed open authorization mechanism to access files in the filesystem that were previously created by the same users authenticated via other legacy mechanisms.

Figure 4:
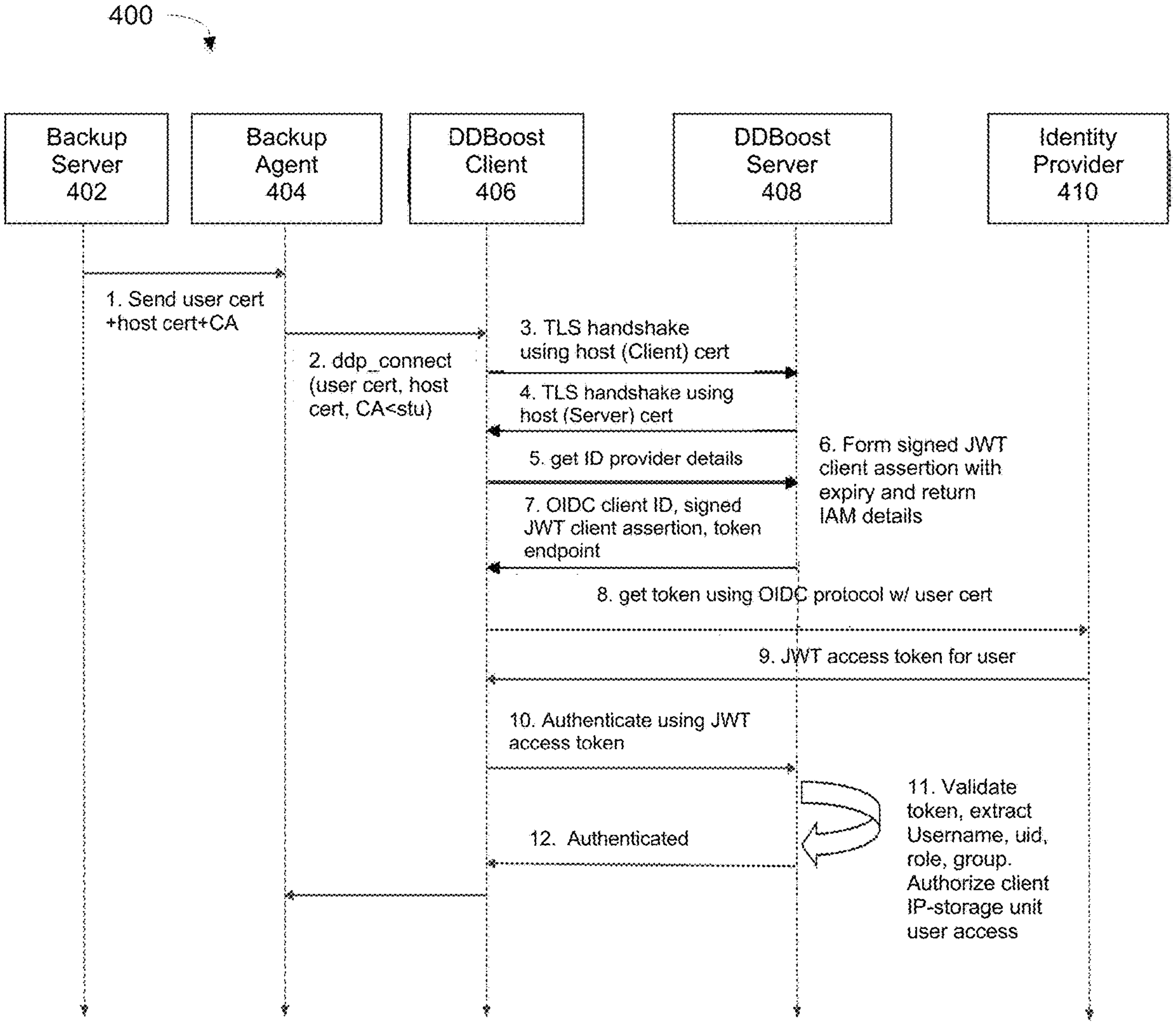
FIG. 4 is a flow diagram illustrating a sequence of operations for an authentication session, under some embodiments.

FIG. 4 is a flow diagram illustrating a sequence of operations for an authentication session, under some embodiments. Certain process flows in diagram 400 are shown for exchanges among backup server 402, backup agent 404, DDBoost client 406, DDBoost server 408, and identity provider 410.

As shown in FIG. 4, process 400 begins with step 1 with the backup server sending the user's certificate plus the host certificate, plus the certificate authority (CA) certificate to the backup agent 404. The backup server is the source of all certificates, which are pre-configured out-of-band before the DDBoost client can be used for the first time. The CA in this case, is the entity signed the user and host certificates, as well as the identity provider's certificate. It is used by the DDBoost client to verify the identity provider's certificate as part of the TLS handshake, and this process happens locally on the backup host.

In step 2 of process 400, the backup agent 404 connects with the DDBoost client through a ddp_connect command with the parameters comprising: {user cert, host cert, CA) received from the backup server 402.

The DDBoost client 406 then opens a TLS connection with the DDBoost server 408 through a TLS handshake where the client uses the host (Client) certificate (step 3), and the server returns the host (Server) certificate (step 4). The DDBoost server 408 then gets the identity provider details from the DDBoost client 406 (step 5). This information is provided in the form of a signed JWT client assertion with expiry and return IAM server details (step 6). The DDBoost server 408 then returns to the DDBoost client 406, the OIDC client ID, signed JWT client assertion, and token endpoint (step 7).

The identity provider 410 gets a token using OIDC protocol with the user cert (step 8). The identity provider 410 then sends a JWT access token for the user to the DDBoost client 406 (step 9), and the DDBoost client authenticates the user with the DDBoost server using the JWT access token (step 10). The DDBoost server validates the token by extracting the user name, UID, role, and group information from the token, and authorizes user access to the storage (step 11). After this, the DDBoost server 408 sends an user authenticated message to the DDBoost client 406 (step 12).

It should be noted that for purposes of description, the terms 'backup host' and 'backup client' may refer to the same entity, while the term 'host' is relevant to the host certificate that is used during the authentication, and which comports with technical usage in TLS nomenclature (i.e., using "host certificate' and not "client certificate"). The term "backup client" is used with respect to DDBoost nomenclature.

To avoid the possibility of any interception or theft of the JWT or of a man-in-the-middle (MITM) attack all communications between and among the server 202, client 204, and storage system 306 occur over a mutually authenticated encrypted connection, such as a Transport Layer Security (TLS) or other Internet encrypted connection between the backup server and backup client. Thus, the links for steps between the DDBoost client 406 and DDBoost server 408 can all be implemented using TLS (or similar) connections.

As part of the regular connection flow, the sequence diagram 400 of FIG. 4 introduces new RPCs. These RPCs help DDBoost client get identity provider details and retrieves the JWT token using those details. The JWT token then can be forwarded to the DDBoost server which can validate the token and allow connection.

Certain additional process steps decide how to get tokens. An RPC request generally happens before the standard OIDC flow for the client to 'discover' the identity provider, where the identity provider's URI is configured on the server. Once this discovery is complete, the client then talks directly to the identity provider using the standard OIDC flow. A first additional step gets identity provider details in the RPC request. This can be achieved using the following example program:

```
Struct get_idp_details_args_v1 {
  uint32_t rpc_version;
};
union get_idp_details_args switch (rpc_version_t
rpc version) {
  case RPC_VERSION_1:
    get_idp_details_args_v1 v1;
  default:
    void;
};
```

A second additional step gets identity provider details in the RPC response. This can be achieved using the following example program:

```
Union oidc_client_auth details switch (oidc_client_auth-
  _method) {
  Case client_secret:
    Client_secret_struct secret;
  Case client_signed_jwt:
    Client_signed jwt_struct client_token;
}
Enum oidc_client_auth_method_t {
  Client_secret,
  Client_signed_jwt
} oidc_client_auth_method;
Enum idp type_t {
  Internal,
  external
} idp_type;
struct ddp_get_iam_details_res_v1_ok {
  dd_uint32_t rpc_version;
  enum idp_type;
  char oidc_client_id [256]; /* 256 is placeholder*/
  enum oidc_client_auth_method;
  oidc_client_auth details clnt_auth_details;
  char token_endpoint_url[256]; /* 256 is place-
    holder*/
};
struct ddp_get_iam_details_res_v1_fail {
  dd_err_t err;
  dd_uint32_t rpc_version;
};
union ddp_get_iam_details_res_v1 switch(nfsstat3 sta-
  tus) {
  case NFS3_OK:
    ddp_get_iam_details res_v1_ok resok;
  default:
    ddp_get_iam_details_res_v1_fail resfail;
};
union ddp_get_iam_details res switch (ddp_rpc_ver-
  sion
rpc_version) {
  case DDP_RPC_VERSION_1:
    ddp_get_iam_details_res_v1 v1;
  default:
    void;
};
```

With this response, the client (e.g., DDBoost client 406) can authenticate the user's certificate with the identity provider 410 and get the JWT token using specified method. This token can be then sent to the storage/backup server 402 for validation.

It should be noted that if the client already holds the token then as part of a reconnection, steps 5 to 9 in sequence diagram 400 can be skipped, and authentication is satisfied after the TLS handshake between the DDBoost server 408 and DDBoost client 409.

Once a connection is established, the client caches the IAM details (endpoint URL) and the "refresh token" that can be used to re-connect to the server in case of a network failure without having to repeat execution of the entire OIDC authentication flow process 400.

Figure 5:
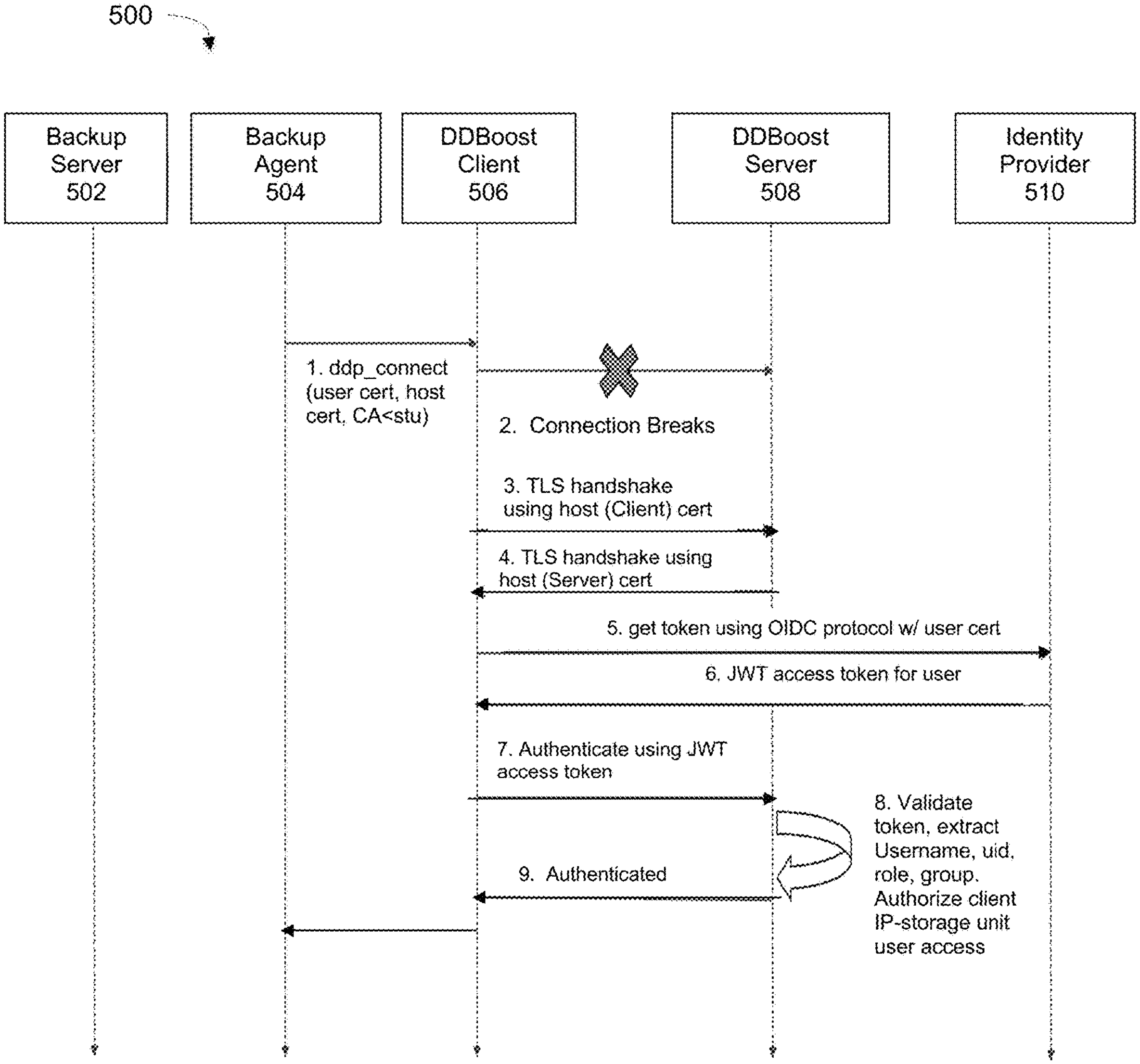
FIG. 5 is a flow diagram for a re-connection process, under some embodiments.

FIG. 5 is a flow diagram for a re-connection process, under some embodiments. Certain process flows in diagram 500 are shown for exchanges among backup server 502, backup agent 504, DDBoost client 506, DDBoost server 508, and identity provider 510.

FIG. 5 illustrates processing steps after the backup server 502 has already sent the user's certificate plus the host certificate and CA to the backup agent 504 through the ddp_connect( ) call with the parameters comprising: {user cert, host cert, CA) previously received from the backup server. The re-connection process commences after any break in the connection. Step 2 shows the break in a current connection between the DDBoost client 506 and DDBoost server 508, which necessitates the re-connection. For this, the DDBoost client 506 opens a TLS connection with the DDBoost server 508 through a TLS handshake where the client uses the host (Client) certificate (step 3), and the server returns the host (Server) certificate (step 4).

The identity provider 510 the gets the token using the OIDC protocol with the user's refresh token certificate (step 5) from the DDBoost client 506. The identity provider 510 then sends a JWT access token for the user back to the DDBoost client 506 (step 6). The DDBoost client authenticates the user with the DDBoost server using the JWT access token (step 7). The DDBoost server validates the token by extracting the user name, UID, role, and group information from the token, and authorizes user access to the storage (step 8). After this, the DDBoost server 408 sends an user authenticated message to the DDBoost client 406 (step 9). The re-connection process steps after the break in connection are performed within the DDBoost client and the application has no knowledge of it.

Embodiments provide for auto-discovery of identity provider server details by the DDBoost client from the DD system, as described above. Each individual backup server does not need to register as an OIDC client with the IAM, making deployment and configuration easier. It implements a non-interactive OIDC flow to authenticate users with an IAM server for data path protocols connecting clients to a remote filesystem.

As described above, the open authorization process implements a specific OIDC flow to distribute tokens to clients and limits exposure of tokens from leaking outside the storage system.

Embodiments provide the use of custom claims to maintain users' identity across federated identity providers and allow interoperability with non-OIDC data path protocols.

In an embodiment, certain legacy data access operations may also be facilitated. Legacy data access is generally a separate event from OIDC access. Legacy access methods rely on on-disk user identifiers that are stored at the time of file creations. These identifiers are contained in the custom claims, and once they are stored on-disk, a legacy protocol can then use them without requiring any OIDC data path processing. The converse is also true, in that if a legacy protocol creates the on-disk file, then the user identifier stored at that time is used later for comparison with the user identifier in the custom claims in the JWT when using OIDC.

Embodiments also allow separate security policies for the same user based on the client making the authentication request, and implements a system design to allow connecting external identity providers (pre-deployed in the customer's environment) to a proprietary IAM server.

Figure 6:
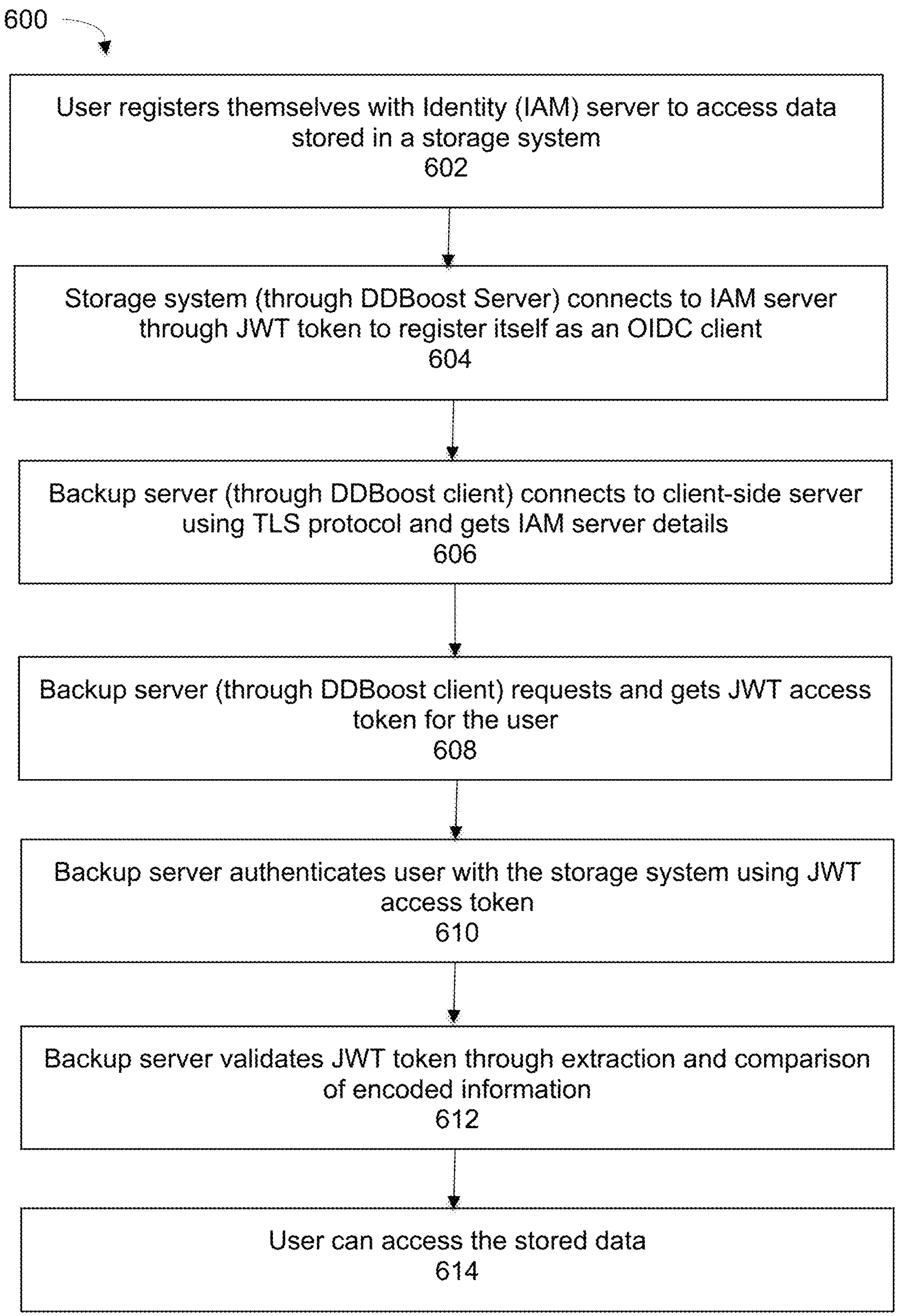
FIG. 6 illustrates an overall process of using open authorization and identity servers to access data protected by legacy access controls, under some embodiments.

FIG. 6 illustrates an overall process of using open authorization and identity servers to access data protected by legacy access controls, under some embodiments. As shown in FIG. 6, process 600 starts with an IAM server that has been used to store information for registered users, such as user ID and secret message information, 602. The storage system, such as through a DDBoost server 408, connects to the IAM server to register itself as an open authorization (OIDC) client 604. The backup server, such as through a DDBoost client 406 connects to the DDBoost server of the storage system through a TLS interface and gets identity provider details, 606.

The backup server (through DDBoost client) requests and gets the JWT token from the identity provider for the user, 608.

The backup server (DDBoost client) then authenticates the user with the storage system (DDBoost server) using the JWT access token, 610. The storage system then validates the token through appropriate extraction and comparison steps to authenticate the user, 612.

The user can then access the storage protected data, 614. In an embodiment, these might include certain legacy access control protocols, as described above.

Client-Side Deduplication (DDBoost) Implementation

As shown in FIG. 1, embodiments can be used in a client-side deduplication system, as typified by the Data Domain Boost environment. In an embodiment, the JWT token method is used systems during DDBoost connection establishment.

Figure 7:
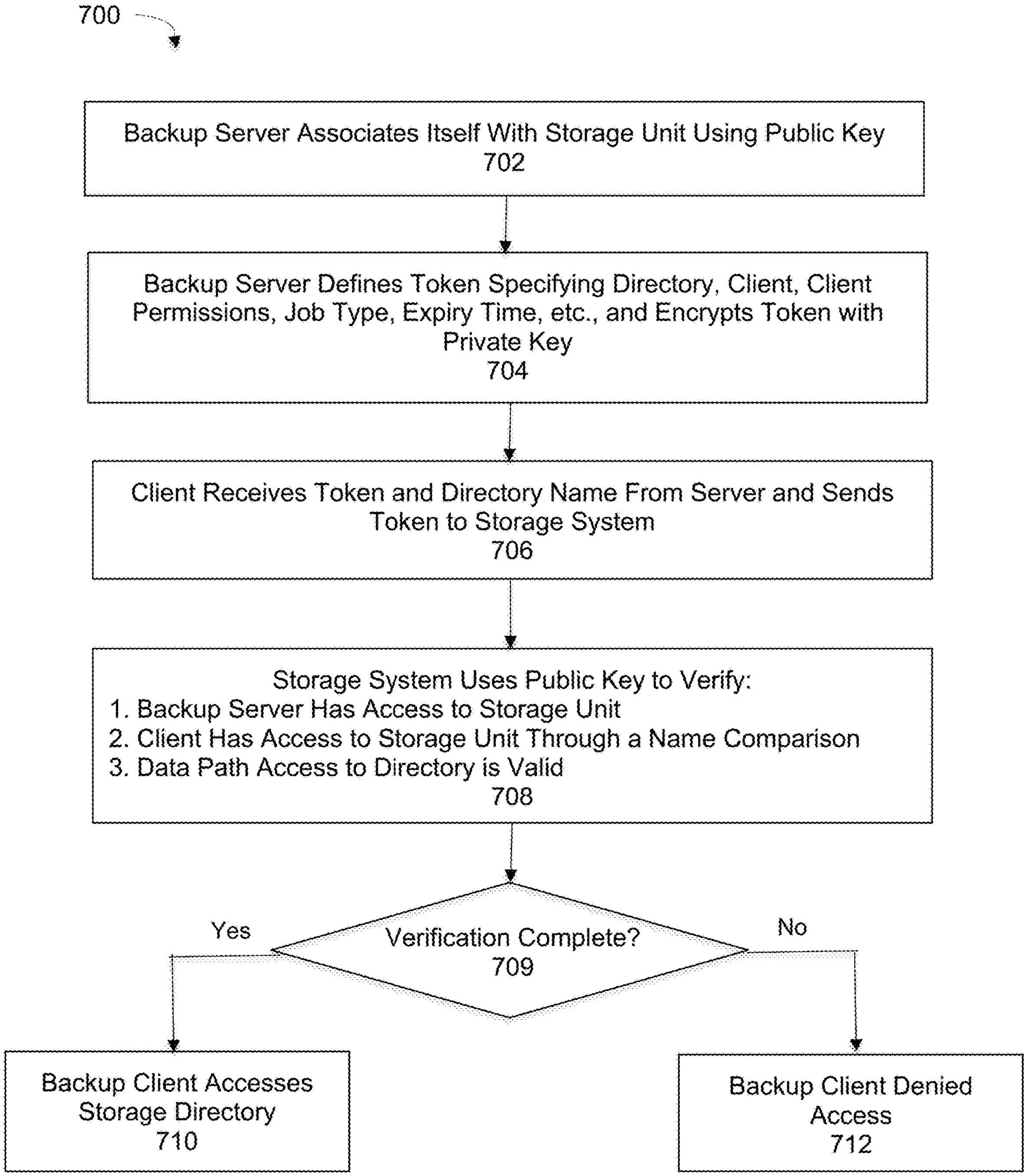
FIG. 7 illustrates a process of user authentication in a DDBoost system, under some embodiments.

FIG. 7 illustrates an overall process of user authentication in a DDBoost system. Process 700 begins with the backup server associating itself with a storage unit (SU) using a public key, 702.

The identity in the client certificate (IP address and/or hostname) will be used on the Data Domain Restorer (DDR) to authenticate the connecting client. When storage units (SUs) are created on the server, a JSON Web Key Set (JWKS) will be associated with the storage unit. The JWKS indicates a set of public keys and determines who can access the storage unit. This is done by having the connecting client system provide a digitally signed JSON web token (JWT) specifying a storage unit, 704. If the JWT was signed with the private key corresponding to the JWKS of the storage unit, then the client system is authorized to access the storage unit. This verifies that the creator of the storage unit, who assigned the public keys to the storage unit and knows the corresponding private key, has provided the JWT to the client system and has granted the client system access to the storage unit, as performed by the token exchange illustrated in step 706. The storage system uses the public key to verify that the backup server has access to the SU, the client has access to the SU through a name comparison, and that the data path to the SU directory is valid, 708.

A UID/GID (User Identifier, Group Identifier) is also assigned to the storage unit at creation time, and this UID/GID is used when creating files and performing access checks on files. This means the UID is determined from the JWT passed to the connection call. Since the UID/GID is determined from the storage unit, there is no way to determine the UID/GID until a storage unit is known. For this reason, a storage unit must be specified when establishing a connection. This is enabled by specifying in the JWT knowledge of the storage unit to be accessed during connection establishment to allow the connection to be made to the node where the storage unit exists. Alternatively, the UID/GID could also be included in the JWT. Storing the UID directly in the JWT would allow, for example, the directory or storage unit to contain files owned by multiple UIDs, and the token would then allow access only to those files in the storage unit with matching UIDs.

In an embodiment, the client uses a ddp_connect_with_config API and parameters, and passes the following three files: a client certificate file, a client private key file, and a server certificate authority (CA) file. It should be the noted that the private key in the client private key file is the private key from the client's X.509 certificate and is part of a different key pair from the public/private key used by the backup server to sign the token. A two-way authentication is operation is done to verify the identity of the server to the client and vice-versa. A JWT will also be included as a parameter to the ddp_connect_with_config API. The JWT includes a storage unit name. The storage unit name is used to access the JWKS assigned to the storage unit at creation. The JWKS is used to verify the digital signature of the JWT. If the signature verifies, the UID/GID pair assigned to the storage unit at creation is used for the connection, and the client is allowed to access over that connection the specified storage unit. Files created using the connection will be assigned this UID/GID.

The owner of the storage unit is considered to be anyone who knows the private key(s) corresponding the JWKS assigned to the storage unit. A more general JWT scheme could allow multiple storage units to be specified in a JWT thus allowing a connection to access more than a single storage unit. A JWT could also include multiple signatures, so if multiple storage units were specified they would not all need to have the same JWKS. Multiple JWKSs could be assigned to storage units, with a different UID/GID for each JWKS. This would allow storage units to contain files owned and accessed by multiple clients, while providing secure access. A directory or file created by a client with a first JWKS would be created with the UID/GID of that JWKS, and would not be accessible to another client with a different JWKS that had a different UID/GID. Different JWKSs could share the same UID/GID, so clients could share files. The JWT or JWKS could also be extended to include access permissions. This would allow a client to be granted only selected access to an storage unit, for example, a client could have read-only access and thus be able to restore files from a storage unit, but not to write or change files in the storage unit.

After successfully connecting to a directory or storage unit via a token, the steps taken when an application opens a file are as follows. The application makes a DDBoost ddp_open_file call, passing as arguments to the call the connection descriptor created using the token and the pathname of the file. A remote procedure call is sent to the server to lookup the pathname and get a file handle. To verify client access, the server notes the connection was authenticated using a token. The token was saved with the server side connection information when the connection was established. The saved token is now checked to see if the token grants access to the specified pathname with the requested permission(s). If not, the open fails, but if so, a call is made to file manager to open the file with the requested access. Thus the DDBoost token check constitutes an extra access check. It can deny access to a file or storage unit, but it cannot allow access that the token creator does not have. The identity used by the file manager for the access check is the identity stored in the token when it was created, i.e., the identity of the token creator. If this open succeeds, it returns a file handle. The server returns a file handle to Boost, and Boost returns a file descriptor to the application.

As shown in process 700 of FIG. 7, the verification step 708 involves the storage system verifying that the client has valid access to the storage unit, as verified in step 709. If verified, the backup client can access the storage, 710, otherwise it is denied access, 712.

In an embodiment, the client name is provided in an X.509v3 certificates. One of the X.509v3 certificate extensions is the Subject Alternative Name extension. This allows for multiple additional names to be bound to the certificate. These names can be of various formats. There can be one or more additional names for each of these formats. Several types of alternative names are of interest. One is an IP address, which can be either an IPv4 address or an IPv6 address, and there can be multiple IP addresses. Next is a domain name server (DNS) name, representing the system as a host name, such as huberal-dl.datadomain.com, or an RFC 822 address, or any other name which allows an application to define a name in arbitrary format and use it in an application specific way.

A signed but unencrypted JWT always consists of three sections: (1) header (metadata); (2) payload (the data contents); and (3) signature (the signature). Both the header and payload are included in the signed data. The Boost JWT must certain information delineated below, which are all represented as "claims" in the JWT.

For an implementation, such as a Boost DD system, the JWT header allows only a few claims, two of which are needed: "alg" the signature algorithm (this is a standard JWT registered header claim). Since public/private keys are being used, the signing algorithm value must always be "RS256"=RSA digital signatures with SHA-256 HMAC. A key identifier ("kid") of the key can be used to sign the JWT. This is a user defined string, so the creator of the keys must assign this, and it should be unique among all keys created by the issuer of keys. This value must be provided to the DD server along with actual key when the storage unit is created. This is used to find the key used to verify this JWT. If only one key is allowed to be associated with a storage unit, then a kid is strictly not needed to identify the proper key to use. If the key assigned to an SU changes, the kid would change. If there is no kid, then if a storage unit's key is changed before a JWT with the old key is verified, then the verification will fail. If there are multiple keys associated with a storage unit, a kid is again not strictly necessary, since verification can be attempted using each of the storage unit's keys to see if any of them successfully verified the JWT.

The payload claims include JWT registered claims for standards items such as expiration time and possible private claims for things like the storage unit identifiers. For an example Boost system, payload registered claims in a Boost JWT are: "iss"—the issuer of the Boost JWT, which is a string identifying the creator of the JWT; "sub"—the subject (client system), which is a string containing the IP address or other client system identifier such as host name of the client allowed to use this JWT (this must match the identity in the client certificate); "exp"—the expiration time when the JWT becomes invalid, which is an integer Posix/Unix epoch value (i.e., the number of seconds since Jan. 1, 1970); "iat" or "nbf"—the issued at time of the JWT or the not before time of the JWT, which are both integer Posix/Unix epoch values; the "issued at" value that can be used to determine that the JWT is recent, and helps prevent replay attacks where an old JWT is used; and/or the "not before time" value that is the time at which the JWT becomes valid; "aud"—the intended audience for the JWT, which is one or more string values (e.g., serial number, IP address, or hostname) identifying the DD systems with which this JWT can be used.

Certain DDBoost defined private claims can also be used in the payload. One such private claim is "boostsu," which is the Boost storage unit the JWT allows access to. The format of this is a string. Other appropriate private claims can also be used depending on specific implementation and use cases.

Following is an example of a valid DDBoost JWT, showing only the header and payload as JSON objects before encoding.

```
{
"alg": "RS256",
"kid": "rsa-key-000001"
}
{
"iss": "PPDM ver. 2.1.5-344574",
```

"sub": "client-test-system.datadomain.com".
"nbf": 1582574400,
"exp": 1582678800,
"aud": "DDOS-server-1.datadomain.com",
"boostsu": "storage-unit1"
}

An example of JSON contents with UID/GID for the "boostsu": "storage-unit1" data may be expressed as follows:

{
"exp": 1648546323,
"iat": 1648546023,
"jti": "73772301-d824-42d8-ade0-e52dc902ad5b",
"iss": "http//10.199.xxx/auth/realms/testrealm",
"aud": "DDBoost-client",
"sub": "cf07b7e8-1e65-410a-a5f0-50cf08ce35e2",
"typ": "Bearer",
"azp": "DDBoost-client",
"session state": "bb080496-37b7-4ee0-a72a-7fdda9b9ab02",
"acr": "1",
"scope": "openid profile Boost-scope email",
"sid": "bb080496-37b7-4ee0-a72a-7fdda9b9ab02",
"upn": "testuser2",
"email_verified": false,
"name": "testuser2 xyz",
"preferred_username": "testuser2",
"email": "testuser2@testdomain.com",
"userinfo": {
"uid": 12345,
"groups": {"testgroup1"},
"role": "boost user"
}
}

In the above example: nbf=1582574400=Monday, Feb. 24, 2020 8:00:00 PM GMT-05:00, exp=1582678800=Tuesday, Feb. 25, 2020 8:00:00 PM GMT-05:00, so the JWT is valid for 24-hours and allows access to the storage unit "storage-unit1" on the DDOS server "DDOS-server.1.datadomain.com" by client system "client-test-system.datadomain.com". The encoded external representation of a signed JWT is as three base 64 URL encoded strings separated by dots ".".

An example of DDBoost token format is as follows:

eyJhbGciOiJIUzI1NiIsInR5cCI6IkpXVCJ9.
eyJzdWIiOiIxMjMONTY3ODk
wIiwibmFtZSI6IkpvaG4gRG9lIiwiYWRtaW4
iOnRydWV9.TJVA95OrM7E2cB
ab30RMHrHDcEfxjoYZgeFONFh7HgQ The above format example does not correspond to the DDBoost example above as it includes no key or signature. Although the values encoded in this JWT are not in the format described above for a DDBoost JWT token, this illustration does show the format of what would actually be passed to the DDBoost ddp_connect_with_config API as a byte array, with a length of 149. Note a byte array is passed, not a string. There is no terminating null character. The above code and format examples are provided for purposes of illustration only, and any other appropriate code and format may be used.

With respect to DDBoost JWT verification and validation by the storage system, when such a token is received, its signature must be verified and its contents must be validated. Validation is done by checking that all of the necessary claims are present with legal values. The validation steps that must be performed on the claims in a DDBoost JWT are provided below by claim type. If any step fails or any of the claims are not present or cannot be read, etc., the JWT is considered invalid and cannot be used to establish a connection or authorize access.

The header is validated by the claims: "alg"—the signature algorithm, and this value must always be "RS256"=RSA digital signatures with SHA-256 HMAC; and "kid"—the key identifier of the key used to sign the JWT.

The payload is validated by the claims "iss"—the issuer of the Boost JWT; "sub"—the subject (client system), which must match an identity (CN or SAN) in the client X.509 certificate, and the subject in the JWT must match one of those values; "exp"—the expiration time, which must be less than the current time (the expiration is checked only when the JWT is used to establish a connection, once the connection is established it is valid until a ddp_disconnect call is made to destroy the connection and if the exp time is reached while the connection is still open, the connection will not be terminated); "nbf"—the not before time, which must be equal to or greater than the current time and must also be less than the exp time; "aud"—the intended audience, which must match an IP address or hostname of the DD system; "boostsu"—the Boost storage unit, which must designate an existing storage unit on the DD system with one or more associated JWKs. The JWK associated with the storage unit (or one of the JWKs) must correctly verify the signature in the JWT. If a kid is required in the JWT, then it must be the JWT identified by the kid that correctly verifies the signature.

Once these DDBoost JWT verification checks are successfully completed, the Boost connection and access by the client to the requested storage unit is then allowed.

Embodiments thus provide a method for secure authentication of backup clients in a way that eliminates the need to create users for backup client authentication anywhere in the backup ecosystem, and which eliminates the need for credentials, such as passwords that need protection, updating and synchronization. Such a method uses JWT tokens for both client and server authentication within the system, and verifies that the tokens grant access using the public key corresponding to the private key assigned to the directory objects by the creator of the directory objects.

Embodiments provide a system in which data is first backed up through a data transfer protocol (e.g., DDBoost) using OAuth2.0. This data can later be accessed through data transfer protocols (e.g., NFS, CIFS) using legacy access methods (e.g., Kerberos, NTLM). The data access protocol in this case differentiates between a control path (over which the authentication occurs), and data path (which performs the authorization).

Embodiments thus combine OAuth as the authentication plus authorization protocol with DDBoost as the proprietary data transfer protocol. In this way, files created by a DDBoost client authenticated via OAuth2.0 can later be accessed via another protocol like NFS/CIFS without any change to their legacy authorization mechanisms, such as those that rely on on-disk UID/GID/SID identifiers.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 8:
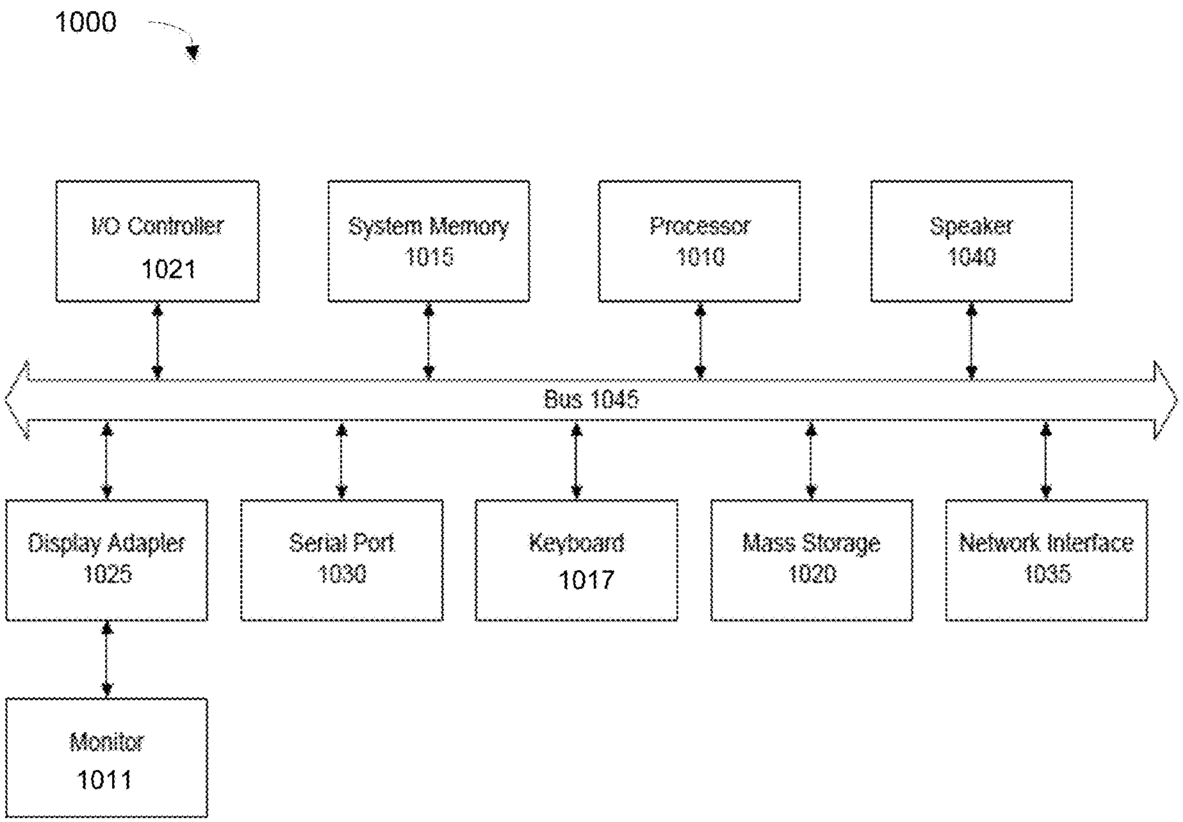
FIG. 8 is a system block diagram of a computer system used to execute one or more software components of a client-side library validation system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 is a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of authenticating backup clients using open authorization protocols, comprising:

storing, in a storage system, data protected from access from anyone but only validated users, wherein the stored data is accessed using a legacy access protocol comprising one of: NTLM or Kerberos protocol;

storing user information in an identity provider server to validate users attempting to access the data;

registering the storage system as an open authorization client with the identity provider through a token;

obtaining, by a backup server accessing the storage system for the user, the token from the storage system;

utilizing an OAuth protocol of the open authorization protocols in conjunction with a Data Domain Boost (DDBoost) data transfer protocol that is used to transfer the data to the backup server;

registering a DDBoost server as an OpenID Connect (OIDC) client with the identity provider server;

storing identity provider details in the DDBoost server for access by any OpenID provider;

validating the token in the storage server through user information stored in the identity provider server; and allowing access by the user as a validated user to the data in the storage system using the legacy access protocol through the OAuth protocol and stored identity provider details.

2. The method of claim 1 wherein the token comprises a JavaScript Object Notation (JSON) web token (JWT), wherein the unique identifier is derived from a user ID and secret phrase of the user.

3. The method of claim 2 further comprising incorporating in the JWT token, custom claims that allow the backup server to derive a unique identifier for the user, and wherein the custom claims are mapped to corresponding fields in a database of the identity provider server storing information of the user.

4. The method of claim 3 wherein the the OAuth protocol comprises a OAuth2.0 protocol.

5. The method of claim 1 further comprising allowing third party applications to use the open authorization process without requiring interaction with the identity provider.

6. The method of claim 1 wherein the backup server comprises a Data Domain server executing a deduplication backup process, and further wherein the deduplication backup process is a distributed system at least partially having a client-side deduplication process executed by the DDBoost server operating in the storage system, and a DDBoost client operating in the backup server.

7. The method of claim 6 further comprising a backup agent communicating backup server instructions to the DDBoost client, the method further comprising sending user certificate, host certificate, and certificate authority information to the DDBoost client for use by the DDBoost server for the validating step.

8. The method of claim 7 wherein the DDBoost client of the backup server and the DDBoost server of the storage system communicate through a transport layer security (TLS) tunnel accessed through remote procedure calls (RPC).

9. A system authenticating backup clients using open authorization protocols, comprising:

a storage system storing backup data protected by limiting access to the data by only validated users, wherein the stored data is accessed using a legacy access protocol comprising one of: NTLM or Kerberos protocol;

an identity provider server storing user identity data in an identity provider server maintained by an identity provider;

a backup application orchestrator passing a user certificate to a backup agent at the time of backup of the backup data to specify a user to be used for the backup session;

a DDBoost server registered as an OpenID Connect (OIDC) client with the identity provider server, wherein identity provider details are stored in the DDBoost server for access by any OpenID provider, the storage system utilizing an OAuth protocol of the open authorization protocols in conjunction with a Data Domain Boost (DDBoost) data transfer protocol that is used to transfer the data to the backup server;

a backup server client process, OIDC receiving a client ID and a signed client assertion received from a storage system server process to obtain an access token for the user denoted by the user certificate, wherein the access token returned by the identity provider server contains custom claims that allow the storage system storing the backup data to derive a unique identifier for the user to be used for authorization to allow access by the user using the legacy access protocol through the OAuth protocol and stored identity provider details.

10. The system of claim 9 further comprising an ID mapper mapping the custom claims to specific fields in the identity provider user information to enable interoperability with other data access protocols of the data and that use same fields to identify the user.

11. The system of claim 10 wherein the OAuth protocol comprises an OAuth2.0 protocol.

12. The system of claim 11 wherein the backup server comprises a Data Domain server executing a deduplication backup process, and further wherein the deduplication backup process is a distributed system at least partially having a client-side deduplication process executed by the DDBoost server operating in the storage system, and a DDBoost client operating in the backup server.

* * * * *